(No Model.)
J. P. HILL.
BARREL TRUCK.
No. 406,646. Patented July 9, 1889.
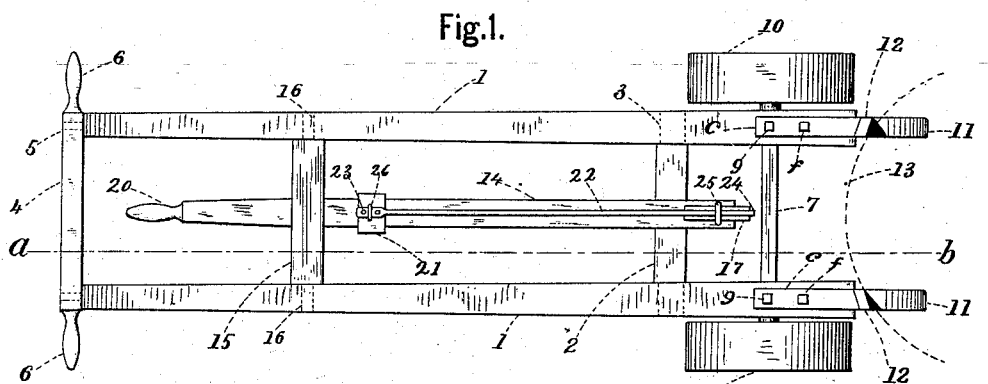
Witnesses.
Arthur J. Sangster
Robert A. Geary
Julian P. Hill, Inventor.
By James Sangster, Attorney.

UNITED STATES PATENT OFFICE.

JULIAN P. HILL, OF BUFFALO, NEW YORK.

BARREL-TRUCK.

SPECIFICATION forming part of Letters Patent No. 406,646, dated July 9, 1889.

Application filed April 13, 1889. Serial No. 307,149. (No model.)

*To all whom it may concern:*

Be it known that I, JULIAN P. HILL, a citizen of the United States, residing in Buffalo, in the county of Erie and State of New York, have invented certain new and useful Improvements in Barrel-Trucks, of which the following is a specification.

My invention is specially designed for taking up and carrying open barrels or boxes, either filled or empty; but it may be used for any purpose for which it is adapted; and it consists in certain improvements whereby the device is rendered more simple in construction, more cheaply made, and more convenient for the purpose designed, all of which will be fully and clearly hereinafter described and claimed, reference being had to the accompanying drawings, in which—

Figure 1 is a top plan view. Fig. 2 is a side elevation in section through line $a\,b$, Fig. 1. Fig. 3 is a side elevation showing the truck in position for holding a barrel, a portion being broken away to expose the pivoted holding-bar.

The two side frame-bars 1 are preferably made of wood, secured together by the forward cross-bar 2, rigidly fastened by mortising, as shown by the dotted lines 3, Fig. 1. At the opposite end is another cross-bar mortised to the frame by the frame ends passing through it, as shown by the dotted lines 5 in said Fig. 1, and at each end of the cross-bar 4 is a handle 6, by which the truck is moved about. The axle is a small bar of iron 7, secured in a recess 8 (see Fig. 2) by a bolt 9, and at each end of the axle is secured in any well-known way the truck-wheels 10, which are made with broad faces, as usual, so as to give a good bearing when moving over soft earth. Forward of the wheels, secured one to each side frame-bar 1, are two grappling or holding irons, each having a forwardly-projecting tapering portion 11, provided with an upward-projecting portion 12, set at an angle, as shown, so as to permit the round form of the barrel to rest against the face, or nearly so, substantially as shown by the dotted lines 13 in Fig. 1.

The grasping and holding irons are rigidly secured in place to the bars 1 by the forked portions $c$ and $e$, and the bolts 9 and $f$. Within the frame-bars 1 is a holding-bar 14, provided with a cross-bar 15, rigidly secured to it and pivoted to the frame-bars by the ends 16 passing through. At the front end of the bar 14 is a hook portion 17, securely fastened to it by bolts or screws, and on its under side, near the hook portion 17, is a downwardly-projecting portion 18, having an inclined back portion 19. The object of the inclined back portion 19 is to permit the pivoted bar to be thrown over the edge of a barrel or box, and then by drawing it back it will rise up as it moves over the edge of the barrel until it comes between the hook 17 and the portion 18, where it will be securely held in place between the two. The downwardly-projecting portion 18 is also important, because by raising the handles 6 upward and forward it provides a convenient means for catching against the top edge of a barrel and tipping it up sufficiently to leave an opening for the pointed portions 11 to pass easily under the bottom edge, so that a barrel may be easily picked up and held in the position shown in Fig. 3, and then carried to any desired point. At the opposite end of the pivoted bar is a handle 20, by which it is tilted up or down while in use. To the bar 14 is secured an easy-fitting collar 21, having a long rod or bar 22 secured to it by bolts 23, so as to be easily removed when required. At the opposite end of the bar 22 is a hook portion 24, and a staple 25 secures that end of the bar 22, but allows it to be easily moved longitudinally. To the top of the collar is a set-screw 26, for adjusting and securing the collar at any desired point on the bar 14. The object of this construction is to provide the means for picking up and carrying boxes or other articles requiring a longer grasping-bar than the bar 14.

In Fig. 2 I have shown the bar 22 and its hook portion as adjusted forward to another point by the dotted lines 27 28 29. When adjusted to any desired point, it is rigidly secured by the thumb-screw. At the rear of the truck the usual supporting angle-iron 30 (shown in Fig. 2) may be secured in any well-known way, when desired; but for ordinary purposes it may be dispensed with, and the supplementary hooked bar 22 may in some cases be dispensed with.

The invention is very simple, and will be readily understood by reference to Fig. 3, in which the barrel 31 is shown in position to be moved.

I claim as my invention—

1. A barrel-truck consisting of the frame portion provided with handles 6, and carrying the wheels and pointed holding-irons, in combination with a tilting bar pivoted between the side frame-bars and provided with two holding-hooks 17 and 18, one directly back of the other, whereby the edge of a barrel may be caught between the two hook portions 17 and 18 and held securely, so that it cannot tip either way, substantially as described.

2. In a barrel-truck, the combination of the frame portions secured together by cross-bars and provided with handles 6 and truck-wheels 10, holding-irons 11, having substantially upright portions 12, and a pivoted tilting bar 14, having a handle 20, hooks 17 and 18, secured to the end of the tilting bars, and a supplementary hook bar secured to a collar made longitudinally adjustable on the tilting bar, for the purposes described.

JULIAN P. HILL.

Witnesses:
JAMES SANGSTER,
ARTHUR J. SANGSTER.